United States Patent Office 3,064,249
Patented Nov. 13, 1962

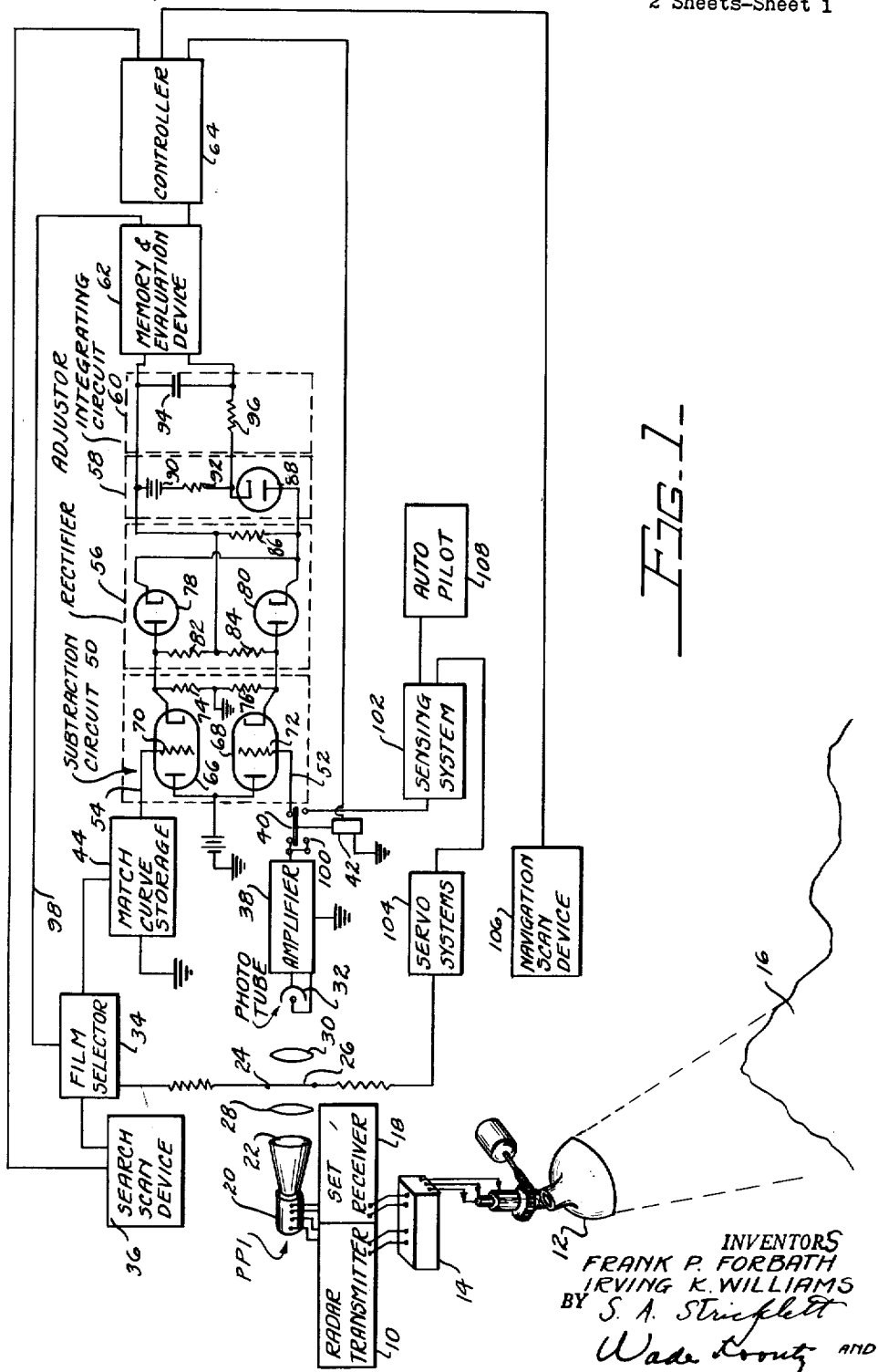

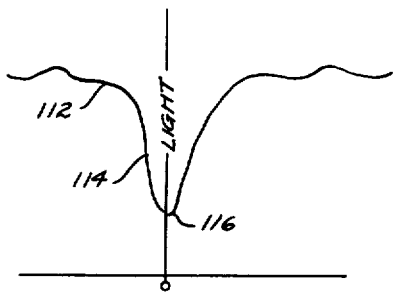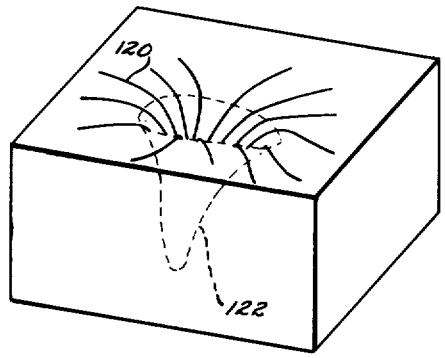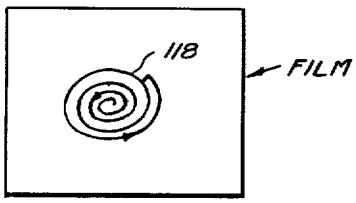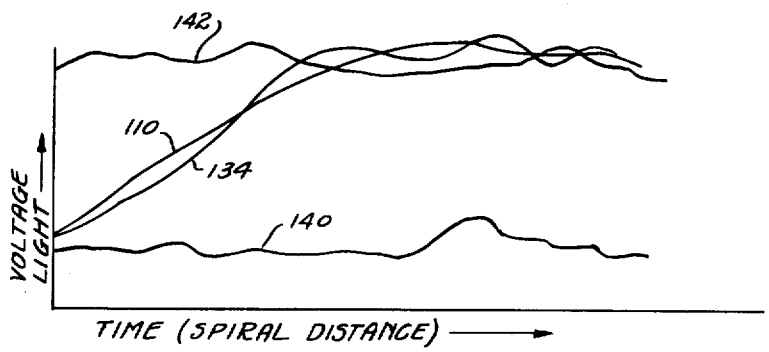

3,064,249
AUTOMATIC CORRELATION COMPARATOR
Frank Paul Forbath, Buffalo, N.Y., and Irving Knight Williams, San Pedro, Calif., assignors to the United States of America as represented by the Secretary of the Air Force
Filed June 21, 1957, Ser. No. 667,301
8 Claims. (Cl. 343—5)

This invention relates to an automatic correlation comparator for the radar map searching phase of a "map-matching" navigation controller and particularly to a system applying a standard match curve to reduce the matching error.

It has heretofore been proposed to provide automatic navigation control of vehicles and particularly guided missiles by so-called "map-matching" navigation.

In radar map-matching navigation, a reconnaissance flight is conducted in which radar equipment usually including a plan-position indicator (PPI) is operated in normal manner to produce a ground return image or map and photographs of the PPI scope are taken at various places along the flight. These photographs are then processed into a series of photo-maps of either positive or negative transparency. When it is desired to conduct another flight using the reconnaissance flight path as a reference, the radar equipment is again operated in the usual manner and the ground return present on the PPI scope is compared with the previously obtained transparencies and the present position with respect to the positions at which the transparencies were taken is obtained.

In the heretofore known "map-matching" systems the light from the radar scope ground return is projected through a film or transparency onto a photoelectric tube. A navigation scanning device causes relative motion between the image and the film to secure the minimum light transmittal. The output of the photoelectric device is fed to a sensing device which works upon the principle that when the negative image is exactly positioned with respect to its counterpart on the scope that a minimum of light is transmitted. The sensing device also controls an autopilot to orient the vehicle in response to the position of match. Since radar map-matching navigation is, by comparison, rather expensive, it is the usual practice to employ that type of navigation only during the portion of the flight in which precise navigation is required. Therefore, when it is desired to initiate radar map-matching navigation, it is necessary to "search" the transparencies to select the one which most nearly correlates to the ground return on the PPI scope. The operation to select the proper transparency is known as the "search phase" of radar map matching.

The "search phase" of radar "map-matching" consists of finding the radar film or transparency that best compares with the ground return image viewed on the radar PPI scope. Each film or transparency represents a different geographical area and hence a means available to closely locate the position of the vehicle. When the proper film is located, the known methods of map-matching navigation are used to maintain the vehicle on course.

This invention is primarily directed to the "search phase" of map-matching navigation and although it will be illustrated and described as applied to "radar" map matching, it will be understood that it would apply to other map-matching navigation, such as optical, infrared, etc.

In the previously known methods and apparatus for accomplishing the "search phase" of radar map-matching navigation, it was the usual practice to successively position the negative transparencies in front of the PPI scope and the transparency was selected which matched the picture on the PPI with a predetermined degree of correlation as detected by the total amount of light transmitted through the transparency.

Heretofore, it has been believed that the transparency position—of a number of transparency positions—that transmits the least light will be the proper transparency to search for match.

Considerable difficulty has been experienced because of improper transparency selection during the search phase. It has been found that, contrary to the heretofore held belief, the transparency scope combination transmitting the minimum of light is not necessarily the proper match. For example, when a radar scope presentation of a low average intensity of ground return, such as a region with a large precentage of water area, is matched with a transparency record of a high intensity ground return (hence, nearly an opaque image on the film negative) the light transmitted may be much less than that transmitted through the true transparency representing the proper ground position.

The present invention provides a correlation comparator for greatly increasing the accuracy of film selection when searching, particularly when searching over terrain with widely varying total intensity of radar ground return. Basically the invention provides devices for comparing correlation, or light transmitted versus displacement functions, with one or more standard "match" comparison curves.

The outputs from the curve and from the displacement function are fed to a subtraction or comparison circuit and the resultant fed to an integrating circuit. The output of the integrator is fed to a memory device. The process is repeated over a predetermined group of transparencies and the results read out of the memory device to select the film most nearly matching the ground return. The selected transparency is positioned before the scope and ordinary map-matching techniques used to control the operation of the vehicle.

It is accordingly an object of the invention to provide an improved map selecting system.

It is a further object of the invention to provide a map correlation function.

It is another object of the invention to compare a correlation function with a standard match curve.

It is still another object of the invention to provide a method of determining the degree of correlation between an image on a PPI scope and an image on a transparency.

Other objects and many of the attendant advantages of the invention will be apparent from the following detailed description taken in connection with the accompanying drawing in which:

FIGURE 1 is a schematic illustration of a navigation system embodying the search means according to the invention;

FIGURE 2 is a graphical presentation of the light transmitted in match operation;

FIGURE 3 is a three-dimensional perspective view of the match light characteristic;

FIGURE 4 is a proposed scanning path to generate a matching function; and

FIGURE 5 is a graphical comparison of various matching functions with a true match curve.

In an exemplary embodiment according to the invention a radar transmitter 10 is connected to a scanning antenna 12 by means of a TR switch 14 and a ground return from a terrain 16 is transmitted from the antenna 12 through the TR switch 14 to a receiver set 18 from whence the ground return is fed to a plan position indicator scope 20 having a viewing field 22 on which the ground return shows as a ground return map.

A transparency carrier 24 is mounted in front of the field 22 in such a manner that a transparency 26 carried by the carrier 24 will be illuminated by the ground return map appearing on the field 22. Usually the carrier 24 will be positioned immediately adjacent the face of the field 22 so that the illumination of the field will be substantially directly transmitted through the transparency 26. However, a lens system 28 may be interposed between the field 22 and the carrier 24 in such manner as to produce a substantially parallel beam of light from the field 22 to the transparency 26. A focusing lens 30 is placed back of the transparency 26 and focuses the light passing through the transparency 26 onto a photoelectric control device 32.

A storage and selector device 34 is provided with a transparency or plurality of transparencies preferably in the form of films showing a section or sections of terrain which may or may not be contiguous. A search scanning device 36 is mechanically connected to the carrier 34 or to some other portion of the device to provide a predetermined relative movement between the transparency 26 and the light received from the screen 22. As is obvious, either the carrier 24 may be passed through the predetermined movement, the screen 22 could be passed through a similar movement or the lens device 28 could be manipulated to control the parallel beam from the screen 22. In either event, the illumination from the screen 22 will be caused to move over transparency 26 in a predetermined fashion such as a spiral as indicated in FIGURE 4.

Relative movement between the source of light and the transparency will cause variable transmission of light to the photosensitive device 32 which will control the flow of current to an amplifier 38. The amplifier 38 will be connected through the front contact 40 of a switching device 42 to a subtractor circuit presently to be described.

A match curve storage device 44 will be provided with one or a plurality of match curves as may be desired. The match curves may either correspond exactly to each of the transparencies 26 or, in certain events, a standard match curve may be utilized with a plurality of transparencies 26. The storage device may be of any suitable type but preferably is in the form of a magnetic recording tape on which the curve has been recorded by any suitable method at least one of which will be presently described.

The matching function provided by the variation of light on the photo sensitive device 32 will be amplified by the amplifier 38 and fed out to a subtractor circuit 50 by means of a feed circuit 52. Likewise, the match curve will be read out of the storage device 44 and supplied over a second supply circuit 54 to the subtraction circuit 50. The matching function will be compared with the match curve and the error will be fed out to a suitable device 56 for determining the absolute value of the voltage difference of the signals supplied to the subtractor 50. The absolute value of the error may be adjusted to any desired exponent, $n$, by any suitable means such as a non-linear amplifying device 58 and the results integrated by means of an integrating circuit 60 and supplied to a memory evaluation device 62.

The recording memory device will then be read out and a selection device will feed one of the records to a controller 64 which will then actuate to determine the further operation of the system.

While any suitable subtraction circuit 50 may be utilized, we have found it convenient to use a pair of parallel connected tubes 66 and 68 having control grids 70 and 72 with one of the grids such as 70 controlled by the match curve from the storage device 44 and the other grid such as 72 controlled by the matching function received from the photo sensitive device 32 through the amplifier 38.

The current through the tubes 66 and 68 appears as a voltage across the resistor devices 74 and 76.

The voltages appearing across the resistors 74 and 76 are supplied to the error evaluating device 56 which herein consists of a pair of rectifier devices 78 and 80 fed by means of impedances 82 and 84, instead of the usual transformer feed. The rectifier 56 provides an output signal voltage proportional to the absolute value of the voltage difference supplied by the subtractor 50. This signal voltage appears across the impedance 86. The ouput signal may be adjusted by the adjuster 58 to provide any desired exponent, $n$, of the absolute magnitude of the voltage difference, $e$, from the subtracting circuit as $H^n$. The adjuster 58 is illustrated by way of example as a non-linear tube 88 which discharges against a bias voltage 90 through a stabilizing impedance 92.

The output voltage of the adjuster 58 is fed to the integrating circuit 60 which herein consists of a capacitor 94 and a charge control impedance 96. It is important that the time characteristic of the integrating circuit be higher than the time characteristic of the matching function. The integrated potential $$E = \int_0^T |e|^n dt$$

from the capacitor 94 will then be fed to the memory device 62 which obviously may be one of many having the desired characteristic but preferably is in the form of a magnetic tape on which the error signal will be recorded. The integrating circuit 60 will be restored to the operating condition by a short circuit of the capacitor 94 after each recording. The memory and evaluating device 62 will be connected to the film selector 34 by means of a control circuit 98 so that a plurality of transparencies 26 may be successively positioned in the carrier 24 to produce the desired matching functions and the results recorded by memory device 62. A synchronizing circuit 99 may be used to tie in the operation of the scan device 36 and the match curve storage 44 with the operation of the selector 34. Upon the occurrence of a predetermined match, or after a predetermined number of transparencies have been evaluated, the evaluating device will supply an impulse to the controller 64 which will cause the positioning of the desired transparency in the holder 24 and disconnect the search scan device 36 and energize the switching device 42 so that the front contacts 100 of the switching device will be closed to disconnect amplifier 38 from the subtractor circuit and connect the amplifier to a sensing system 102. This sensing system will operate a servo system 104 which in connection with a navigation scanning device 106 will cause map matching navigation in known manner which will operate an auto pilot 108 to control the navigation of any vehicle in which the matching system is installed.

The memory and evaluation circuit should be of the type which refers the signals from the capacitor 94 back to ground potential for use by its memory circuit. Likewise, a clamping circuit may be utilized between the adjuster 58 and the integrating circuit 60. Obviously amplifiers may be used where desired. Such devices have been eliminated from the drawing and description for purposes of clarity.

In the operation of the system, according to the invention, a reconnaissance voyage will be made over the target terrain and one or more return map photographs will be made. At least one map will be made covering the exact target area. Preferably a plurality of successive terrain maps will be made so that controlled flight will be established throughout a major portion of the succeeding voyage.

In order to make a matching curve corresponding to each of the reconnaissance photo maps a positive and a negative transparency will be made of each of the reconnaissance maps. The corresponding positive and negative transparencies will be superimposed and a predetermined illumination will be passed through the positive and negative maps which will be spirally scanned relative to each other and the transmitted light will be converted to an electrical signal by a photosensitive device and the electrical signal recorded as a match curve 110, as shown in FIGURE 5. The curve 110 is then a function of the varying total amount of light passed through the positive and negative transparencies. The matching curves 110 may be recorded by any recording device, but a magnetic tape recording was found very convenient. Preferably match curves 110 are provided for each reconnaissance transparency 26, although in certain instances a single match curve may serve for a plurality of transparencies 26.

When light is transmitted from a plan position indicator through a transparency which is negative with respect to the image on the plan position indicator, it will be found that the transmitted light will be a substantial minimum as shown in FIG. 2 when the image on the scope and the image on the transparency intercepts the light from the image on the scope and substantially neutralizes the same. As seen in FIG. 2, it will be seen that the recorded light 112 will have a normal level and as the images approach register there will be a steady decrease in the amount of light as shown in 114 until at 116 complete register will have been accomplished on a minimum of light transmitted. When the spiral scan is produced as shown at 118 in FIGURE 4, a substantially three-dimensional scan figure will result, as shown in FIG. 3, so that regardless of the direction of motion of the device, the various light intensity lines 120 will all converge at the minimum point 122. Upon attempting to match the ground return at any particular instant, with one of the stored transparencies, the match function as indicated at 140, 142 and 134 will be compared and the error stored in the memory device 62.

As indicated in FIGURE 5, the match functions 140 and 142 widely vary from the match curve 110. However, the function 134 closely approaches the match curve 110 so that the selector device 62 will cause the selection of the transparency conforming to function 134 to be placed in scanning position for normal map-matching navigation.

It is to be noted that the function 134 does not exactly correspond to the matching curve 110 and that these variations may occur by various reasons such as the difference in reflectivity characteristic of the terrain between the reconnaissance voyage and the following voyage on which variations may occur because of variation of the intensity of the image on the plan position indicator, or by technical differences in the preparation of the transparency 26.

It will thus be seen that the present invention provides a means for selecting one of a plurality of transparencies which most nearly match with a given ground return, or may be utilized to cause operation when a ground return corresponds with a single given transparency.

For purposes of exemplification a particular embodiment of the invention has been shown and described according to the best present understanding thereof. However, it will be apparent to those skilled in the art that various changes and modifications in the construction and arrangement of the parts thereof may be readily resorted to without departing from the true spirit and scope of the invention.

We claim:

1. The method of determining the degree of correlation between an image on a cathode ray tube and an image on a first transparent film which includes the steps of: projecting light through said first transparent film and a second transparent film having an image thereon which is the inverse of said image on said first transparent film, causing relative displacement by predetermined movement between "said" image on said first transparent film and said image on said second transparent film thereby producing a varying total amount of light which has passed through said first transparent film and said second transparent film, projecting said image on said cathode ray tube through said first transparent film, causing relative displacement by said predetermined movement between said image on said cathode ray tube and said image on said first transparent film thereby producing a varying total amount of light from said cathode ray tube which has passed through said first transparent film and comparing said varying total amount of light which has passed through said first transparent film and said second transparent film with said varying total amount of light from said cathode ray tube which has passed through said first transparent film.

2. The method of determining the degree of correlation between an image on a cathode ray tube and an image on a first transparent film which includes the steps of: projecting light through said first transparent film and a second transparent film having an image thereon which is the inverse of said image on said first transparent film causing relative displacement by predetermined movement between said first transparent film and said second transparent film, producing a first electrical signal which is a function of the varying total amount of light which has passed through said first transparent film and said second transparent film, projecting said image on said cathode ray tube through said first transparent film, causing relative displacement by movement equal to said predetermined movement between said image on said cathode ray tube and said image on said first transparent film, producing a second electrical signal which is a function of the varying total amount of light from said cathode ray tube which has passed through said first transparent film, subtracting said first electrical signal from said second electrical signal thereby producing a third electrical signal, and integrating said third electrical signal.

3. A method of map selection which comprises securing a ground return map, preparing a positive and negative transparency of said map, transmitting a light beam through said transparencies, causing relative movement between said transparencies, recording the light transmitted through said transparencies to generate a match curve, positioning that one of said transparencies which is negative with respect to the ground return image on a plan position indicator scope in light receiving relation to said ground return causing relative movement between said ground return image and said transparency to generate a comparison function, comparing said function with said curve to determine the degree of match between said ground return image and said map transparency.

4. A method of producing a correlation function which comprises securing a ground return map, preparing a positive and negative transparency of said map, transmitting a light beam through said transparencies, causing relative spiral movement between said transparencies, recording the light transmitted through said transparencies to generate a match curve.

5. A selector system comprising a ground return device operative to present a light emitting ground return map, a transparency map corresponding to a preselected ground return, a transparency carrier operative to present said transparency in light receiving relation to said light emitting map, a photo sensitive device positioned to receive light emitted by said ground return map and transmitted by said transparency, driving means operative to produce a predetermined relative movement between said light emitting map and said transparency whereby said photo sensitive device produces a correlating function dependent upon the light emission of said light emitting map and the light transmission of said transparency map, a match curve storage device, circuit means for reading out a curve from said storage device, circuit means operative to compare said function with said curve.

6. A match selector comprising a radar terrain searcher including a plan position indicator, presenting means operable to successively present a sequence of transparencies before said plan position indicator, scanning mechanism operative to produce a predetermined scanning action between said plan position indicator and the successive transparencies whereby a comparison function is generated for each of the successively presented transparencies, a subtraction circuit, means operable to impress a standard comparison factor on said subtraction circuit, means feeding said comparison function into said subtraction circuit, a memory device operative to store and evaluate the outputs of said subtraction circuit.

7. A match selector system comprising a ground return device including a plan position indicator, a transparency corresponding to a predetermined ground return, a carrier operative to position said transparency in predetermined relation to said plan position indicator, a lens interposed between said indicator and said transparency, a light responsive electrical transmitter mounted to receive light transmitted from said indicator through said transparency to produce a comparison function, a comparison curve, a subtraction circuit operative to compare said function with said curve, a controller operative to terminate said comparison upon the occurrence of a predetermined match between said function and said curve.

8. A selector system comprising search means presenting a light emitting ground return map, a plurality of transparency maps corresponding to preselected ground returns, a carrier operative to sequentially present said transparency maps in light receiving relation to said ground return map, a light focusing means interposed between said ground return and said transparency; a photo cell positioned to receive light emitted from said ground return and transmitted through said transparency, driving means operative to produce a predetermined relative movement of the focused light over said transparency to produce a match function dependent upon the light emission of the ground return and the light transmission of said transparency, a match curve storage device adapted to record match curves corresponding to the several transparencies, circuit means operative to read out said curves, a subtraction circuit operative to compare said match functions with said match curves, a memory device operative to store said comparisons, selector means responsive to said comparisons for selecting one of said transparencies for map matching navigation.

References Cited in the file of this patent

UNITED STATES PATENTS

| | | |
|---|---|---|
| 2,679,636 | Hillyer | May 25, 1954 |
| 2,787,188 | Berger | Apr. 2, 1957 |